United States Patent [19]
Takuman et al.

[11] Patent Number: 6,090,879
[45] Date of Patent: Jul. 18, 2000

[54] SILICONE RUBBER COMPOSITION FOR APPLICATION AS ELECTRICAL INSULATION

[75] Inventors: Osamu Takuman; Takao Matsushita, both of Chiba Prefecture, Japan

[73] Assignee: Dow Corning Toray Silicone Co., Ltd., Tokyo, Japan

[21] Appl. No.: 08/862,045

[22] Filed: May 22, 1997

[30] Foreign Application Priority Data

May 24, 1996 [JP] Japan .................................. 8-152978

[51] Int. Cl.⁷ ...................................................... C08K 3/10
[52] U.S. Cl. ........................ 524/437; 523/203; 523/209; 523/212; 524/588
[58] Field of Search .................... 524/437, 588; 523/203, 209, 212

[56] References Cited

U.S. PATENT DOCUMENTS

| | | | |
|---|---|---|---|
| 4,476,155 | 10/1984 | Niemi ......................................... | 427/58 |
| 5,369,161 | 11/1994 | Kunieda .................................. | 524/266 |
| 5,519,080 | 5/1996 | Matsushita et al. ..................... | 524/437 |
| 5,625,022 | 4/1997 | Onishi ........................................ | 528/15 |
| 5,691,407 | 11/1997 | Azechi ..................................... | 524/437 |
| 5,824,729 | 10/1998 | Matsushita et al. ..................... | 524/437 |

*Primary Examiner*—Robert Dawson
*Assistant Examiner*—Jeffrey B. Robertson
*Attorney, Agent, or Firm*—William F. Boley; Jennifer S. Warren

[57] ABSTRACT

A silicone rubber composition for application as electrical insulation that cures into a highly water-resistant silicone rubber that has excellent electrical properties and in particular has excellent high-voltage electrical insulation properties. The silicone rubber composition comprises (A) polyorganosiloxane,
(B) surface-treated aluminum hydroxide powder surface treated with an organosilane or organosilazane, and
(C) curing agent.

Also, the composition afforded by the addition of 1 to 200 weight parts (D) microparticulate silica to components (A) to (C).

15 Claims, No Drawings

SILICONE RUBBER COMPOSITION FOR APPLICATION AS ELECTRICAL INSULATION

BACKGROUND OF INVENTION

This invention is silicone rubber compositions for application as electrical insulation (referred to below as EI silicone rubber compositions). More specifically, this invention relates to an EI silicone rubber composition that is particularly well adapted for application as electrical insulation because after its cure it exhibits an excellent water resistance and also excellent electrical properties, for example, volume resistivity, dielectric constant, dissipation factor, tracking resistance, arc resistance, and erosion resistance.

Compositions made by blending aluminum hydroxide powder into silicone rubber compositions are already known. It is also known that silicone rubbers with excellent electrical properties can be obtained by the cure of silicone rubber compositions of this type (Japanese Patent Publication Kokoku Number Hei 5-12805 (12,805/1993) and Japanese Patent Application Kokai Number Hei 7-57574 (57,574/1995)). However, these silicone rubber compositions contain large amounts of the aluminum hydroxide powder, which is a strongly water absorptive hydrate, and as a result have poor water resistance. These compositions absorb moisture with the passage of time, leading to a decline in their electrical insulating properties, and hence are not fully acceptable as an EI silicone rubber composition for high-voltage use.

The present invention was achieved as a result of extensive research by the present inventors directed to solving the problems described above. In specific terms, the object of the present invention is to provide a silicone rubber composition that cures into a highly water-resistant silicone rubber that has excellent electrical properties.

SUMMARY OF INVENTION

A silicone rubber composition for application as electrical insulation that cures into a highly water-resistant silicone rubber that has excellent electrical properties and in particular has excellent high-voltage electrical insulation properties. The silicone rubber composition comprises (A) polyorganosiloxane, (B) surface-treated aluminum hydroxide powder surface treated with an organosilane or organosilazane, and (C) curing agent.

Also, the composition afforded by the addition of 1 to 200 weight parts (D) microparticulate silica to components (A) to (C).

DESCRIPTION OF INVENTION

The present invention is an EI silicone rubber composition comprising (A) 100 weight parts polyorganosiloxane comprising at least 2 silicon-bonded alkenyl groups in each molecule and having average compositional formula $$R_a SiO_{(4-a)/2},$$

where R is selected from substituted and unsubstituted monovalent hydrocarbon groups and a has a value from 1.95 to 2.05, (B) 1 to 300 weight parts surface-treated aluminum hydroxide powder surface treated with an organosilane or organosilazane, and (C) curing agent in a quantity sufficient to cure the composition.

The present EI silicone rubber composition can further comprise (D) 1 to 200 weight parts microparticulate silica.

To explain the preceding in greater detail, the polyorganosiloxane (A), which is the base ingredient of the present composition is described by the average compositional formula $R_a SiO_{(4-a)/2}$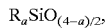. R in this formula is selected from substituted and unsubstituted monovalent hydrocarbon groups and is exemplified by alkyl groups such as methyl, ethyl, and propyl; alkenyl groups such as vinyl, allyl, butenyl, and hexenyl; aryl groups such as phenyl; as well as 3,3,3-trifluoropropyl, 2-phenylethyl, and 2-cyanoethyl. Methyl preferably makes up at least 50 mole % of the R groups. The subscript a in the formula can have a value from 1.95 to 2.05. Moreover, component (A) contains at least 2 silicon-bonded alkenyl groups in each molecule. The alkenyl can be bonded in terminal or non-terminal positions or at both positions. The molecular structure of component (A) can be straight chain or partially branched straight chain. The viscosity of component (A) is not critical, but a viscosity at 25° C. of from 100 mPa.s to 20,000,000 mPa.s is preferred. Component (A) may be a homopolymer or copolymer or a mixture of such polymers. The units constituting component (A) are exemplified by the dimethylsiloxy, vinylmethylsiloxy, methylphenylsiloxy, and (3,3,3-trifluoropropyl)methylsiloxy units. The endblocking groups for component (A) are exemplified by trimethylsiloxy, silanol, vinyldimethylsiloxy, and vinylmethylhydroxysiloxy. The instant polyorganosiloxane is exemplified by vinyldimethylsiloxy-endblocked dimethylsiloxane-vinylmethylsiloxane copolymers, vinyldimethylsiloxy-endblocked polydimethylsiloxanes, silanol-endblocked dimethylsiloxane-vinylmethylsiloxane copolymers, vinylmethylhydroxysiloxy-endblocked dimethylsiloxane-vinylmethylsiloxane copolymers, and vinyldimethylsiloxy-endblocked dimethylsiloxane-methylphenylsiloxane-vinylmethylsiloxane copolymers.

The surface-treated aluminum hydroxide powder (B) used in the present composition has its surface treated with an organosilane or organosilazane and is the essential component for providing the silicone rubber afforded by cure of the present composition with excellent water resistance and excellent electrical properties. The aluminum hydroxide powder comprising component (B) has a particle size preferably from 0.1 to 100 μm and more preferably from 0.1 to 50 μm. The organosilane which can be used as a treating agent for component (B) is exemplified by methyltrimethoxysilane, methyltriethoxysilane, phenyltrimethoxysilane, ethyltrimethoxysilane, n-propyltrimethoxysilane, vinyltrimethoxysilane, allyltrimethoxysilane, butenyltrimethoxysilane, hexenyltrimethoxysilane, γ-methacryloxypropyltrimethoxysilane, dimethyldimethoxysilane, dimethyldiethoxysilane, diphenyldimethoxysilane, tetraethoxysilane, and the partial hydrolyzates of the preceding. The organosilazane which can be used as a treating agent for component (B) is exemplified by hexamethyldisilazane and divinyltetramethyldisilazane.

Component (B) can be prepared by treating the surface of the aluminum hydroxide powder with the organosilane or organosilazane described above by adding the aluminum hydroxide powder and organosilane or organosilazane to a mixer and blending. The treatment temperature during this procedure is preferably from 50° C. to 200° C. and more preferably from 80° C. to 180° C. This preparation can also be carried out during production of the silicone rubber base compound by adding the aluminum hydroxide powder and organosilane or organosilazane to component (A) and mixing while heating. The ratio of the organosilane or organosilazane to the aluminum hydroxide powder during preparation is preferably from 0.1 to 30 weight %. Component (B) is added to the present composition at from 1 to 300 weight parts and preferably at from 30 to 200 weight parts, in each case per 100 weight parts component (A). The addition of less than 30 weight parts component (B) leads to inadequate results in terms of electrical properties, such as tracking resistance and arc resistance. The addition of more than 200 weight parts component (B) leads to a substantial embrittlement of the cured product and prevents the achievement of good rubber properties.

The curing agent (C) used in the present composition cures the composition. organoperoxides are a typical example of this component and are exemplified by benzoyl peroxide, tert-butyl perbenzoate, 2,4-dichlorobenzoyl peroxide, dicumyl peroxide, and 2,5-dimethyl-2,5-di(tert-butylperoxy)hexane.

Another example of the curing agent (C) is the combination of a hydrosilylation reaction catalyst and polyorganohydrogensiloxane comprising at least 3 silicon-bonded hydrogen atoms in each molecule. The polyorganohydrogensiloxane is a crosslinker component. In this case, the present composition undergoes crosslinking and curing as a result of the addition reaction of the silicon-bonded hydrogen in the polyorganohydrogensiloxane to the silicon-bonded alkenyl in component (A) in the presence of the hydrosilylation reaction catalyst. The polyorganohydrogensiloxane must contain at least 3 silicon-bonded hydrogen atoms in each molecule. The non-hydrogen silicon-bonded organic groups in the polyorganohydrogensiloxane are exemplified by alkyl groups such as methyl, ethyl, and propyl; aryl groups such as phenyl and tolyl; and substituted alkyl groups such as 3,3,3-trifluoropropyl and 3-chloropropyl.

This polyorganohydrogensiloxane can have a straight-chain, branch-containing straight-chain, cyclic, or network molecular structure. While its viscosity is not critical, its viscosity at 25° C. is preferably from 3 mPa.s to 10,000 mPa.s. This component is added in a quantity that provides a value from 0.5:1 to 20:1 and preferably from 1:1 to 3:1 for the ratio of the number of moles of silicon-bonded hydrogen in the composition to the number of moles of silicon-bonded alkenyl in the composition. The present composition will not undergo an acceptable cure when this molar ratio has a value below 0.5. A value in excess of 20 can cause the production of gaseous hydrogen and foaming.

The hydrosilylation reaction catalyst used in combination with the above-described polyorganohydrogensiloxane is a cure-accelerating catalyst. Preferred among such catalysts are platinum metal, platinum compounds, and compositions whose principal component is a platinum compound, in each case insofar as the particular species manifests a catalytic activity that accelerates the hydrosilylation reaction. The platinum catalysts are exemplified by chloroplatinic acid, alcohol-modified chloroplatinic acid, platinum/diketone complexes, platinum/olefin complexes, chloroplatinic acid/alkenylsiloxane complexes, and these species supported on a carrier such as alumina or carbon black. This component is added in a catalytic quantity, generally at from 1 to 150 weight parts and preferably at from 5 to 100 weight parts, in each case as platinum metal for each 1,000,000 weight parts component (A).

The microparticulate silica (D) which may be used in the present composition is a reinforcing filler. This component is added when higher levels of mechanical strength are required of the silicone rubber afforded by the cure of the present composition. The microparticulate silica (D) is exemplified by reinforcing silica micropowders such as dry-process silicas, for example, fumed silica, and wet-process silicas, for example, precipitated silica, and by semi-reinforcing silica micropowders such as quartz powder and diatomaceous earth. Preferred for this component are silica micropowders with a particle size <50 µm and a specific surface area of $\geq 50$ m$^2$/g. Even more preferred are silica micropowders of this type whose surfaces have been hydrophobicized by treatment with an organosilicon compound such as an organosilane, organosilazane, or organosiloxane oligomer. High mechanical strength of the cured composition is not achieved when too little of component (D) is added and a loss of fluidity occurs when too much is added. As a result, component (D) should be added at from 1 to 200 weight parts and preferably at from 1 to 60 weight parts, in each case per 100 weight parts component (A). When component (D) is added, the total addition of components (B) and (D) is preferably from 30 to 300 weight parts per 100 weight parts component (A).

While the present composition comprises the above-described components (A), (B), and (C) or (A), (B), (C), and (D), insofar as the object of the present invention is not impaired the composition may also contain those additives heretofore known for use with silicone rubber compositions, for example, non-reinforcing fillers, pigments, heat stabilizers, flame retardants, internal release agents, and surface-treatment agents. The non-reinforcing fillers are exemplified by diatomaceous earth, quartz powder, mica, aluminum oxide, and titanium oxide. The pigments are exemplified by carbon black and iron oxide red, while the heat stabilizers are exemplified by rare earth oxides, rare earth hydroxides, cerium silanolates, and the cerium salts of fatty acids.

The present composition can be prepared simply by mixing the above-described components (A), (B), and (C) or components (A), (B), (C), and (D) to homogeneity. The components can be mixed using those mixing means heretofore known for use with the usual silicone rubber compositions, for example, kneader mixers, twin-screw continuous compounding extruders, and two-roll mills.

When an organoperoxide is used as the curing agent, the present composition can be cured by heating to a temperature at or above the decomposition temperature of the organoperoxide, for example, 130° C. to 200° C. When, on the other hand, the combination of a hydrosilylation reaction catalyst and polyorganohydrogensiloxane has been used, the composition can be cured by heating to 70° C. to 200° C. The method for molding the present silicone rubber composition should be selected according to the particular purpose from the heretofore known molding methods, such as compression molding and extrusion molding.

The present composition as described above cures into highly water-resistant products that evidence low water absorption and excellent electrical properties. These products have particularly good high-voltage electrical insulating properties. Thus, the instant silicone rubber composition is well suited for use in applications that require such properties, for example, for the preparation of silicone rubber electrical insulation for outdoor use.

The invention is explained below through working examples, in which "parts" means "weight parts" and the values reported for viscosity were measured at 25° C. The electrical properties were measured in the examples using the following methods.

Measurement of the electrical properties of the silicone rubber composition was performed on samples press-vulcanized for 10 minutes at 170° C. to mold a 2 mm-thick silicone rubber sheet. The volume resistivity, dielectric constant, and dissipation factor were measured by the methods provided in JIS C 2123, "Test Methods for Silicone Rubber Compounds". The volume resistivity was measured using a high resistance meter (High Resistance Meter 4339A from the Hewlett-Packard Company) and the dielectric constant and dissipation factor were measured using an automatic instrument for loss measurement in dielectrics (TR-1100 Model Automatic Loss Measurement Instrument for Dielectrics from Andoh Denki Kabushiki Kaisha, 110 Hz).

The anti-tracking test was run in accordance with the method stipulated in IEC Publication 587 using a model HAT-520 from Hitachi Kasei Kogyo Kabushiki Kaisha. The test voltage was 3.5 kV. The evaluation A referenced in the tables refers to the time required until the current flowing in a high-voltage circuit passing through the test specimen exceeded 60 mA. The evaluation B referenced in the tables refers to the time for tracking to reach a mark placed on the surface of the test specimen at a position 25 mm from the lower electrode.

Measurement of the water resistance of the silicone rubber composition was made on samples press-vulcanized for 10 minutes at 170° C. to mold a 2 mm-thick silicone rubber sheet. This sheet was dipped in de-ionized water at room temperature for 100 hours and then withdrawn and the electrical properties were measured on the resulting sample. The percent water absorption was also measured from the weight change in the sheet as determined from its weight pre- and post-immersion.

EXAMPLE 1

A silicone rubber base compound was prepared by combining the following and mixing to homogeneity in a kneader mixer: 100 parts vinyldimethylsiloxy-endblocked dimethylsiloxane-vinylmethylsiloxane copolymer gum containing 99.87 mole % dimethylsiloxy units and 0.13 mole % vinylmethylsiloxy units and 160 parts aluminum hydroxide powder whose surface had been treated with vinyltrimethoxysilane (brand name: Higilite H42STV from Showa Denko Kabushiki Kaisha, average particle size=1 μm). 0.8 Part of a 50 weight % silicone oil paste masterbatch of 2,5-dimethyl-2,5-di(tert-butylperoxy)hexane (curing agent) was mixed to homogeneity on a two-roll mill into 100 parts of the above-described silicone rubber base to give a curable EI silicone rubber composition. This silicone rubber composition was press-vulcanized for 10 minutes at 170° C. to mold a 2 mm-thick silicone rubber sheet, on which the electrical properties and water resistance were measured. These measurement results are reported in Table 1.

EXAMPLE 2

A silicone rubber base compound was prepared by combining the following and mixing to homogeneity in a kneader mixer: 100 parts vinyldimethylsiloxy-endblocked dimethylsiloxane-vinylmethylsiloxane copolymer gum containing 99.87 mole % dimethylsiloxy units and 0.13 mole % vinylmethylsiloxy units and 160 parts aluminum hydroxide powder whose surface had been treated with γ-methacryloxypropyltrimethoxysilane (brand name: Higilite H320ST from Showa Denko Kabushiki Kaisha, average particle size=8 μm). 0.8 Part of a 50 weight % silicone oil paste masterbatch of 2,5-dimethyl-2,5-di(tert-butylperoxy) hexane (curing agent) was mixed to homogeneity on a two-roll mill into 100 parts of the above-described silicone rubber base to give a curable EI silicone rubber composition. This silicone rubber composition was press-vulcanized for 10 minutes at 170° C. to mold a 2 mm-thick silicone rubber sheet, on which the electrical properties and water resistance were measured. These results are reported in Table 1.

The values reported in Table 1 for the electrical properties and water resistance of the silicone rubber composition prepared as described above were measured as in Example 1.

Comparative Example 1

A silicone rubber composition was prepared as in Example 1, but in this case using an untreated aluminum hydroxide powder (brand name: Higilite H42M from Showa Denko Kabushiki Kaisha, average particle size=1 μm) in place of the vinyltrimethoxysilane-treated aluminum hydroxide powder (brand name: Higilite H42STV from Showa Denko Kabushiki Kaisha, average particle size=1 μm) that was used in Example 1.

The properties of this silicone rubber composition were measured as in Example 1 and the obtained results are reported in Table 1.

EXAMPLE 3

The following were mixed to homogeneity in a kneader mixer into 100 parts vinyldimethylsiloxy-endblocked dimethylsiloxane-vinylmethylsiloxane copolymer gum containing 99.87 mole % dimethylsiloxy units and 0.13 mole % vinylmethylsiloxy units: 30 parts surface-treated fumed silica with a specific surface area of 120 m²/g (Aerosil R972 from Nippon Aerosil Kabushiki Kaisha) and 3 parts silanol-endblocked polydimethylsiloxane with a viscosity of 30 mPa.s. This was followed by the addition of 160 parts aluminum hydroxide powder (surface pre-treated with methyltrimethoxysilane) with mixing at room temperature. The addition to 100 parts of this base of curing agent as described in Example 1 afforded a curable silicone rubber composition. The methyltrimethoxysilane-treated aluminum hydroxide powder used in this case had been prepared by adding 1 part methyltrimethoxysilane to 100 parts of an untreated aluminum hydroxide powder (brand name: Higilite H42M from Showa Denko Kabushiki Kaisha) and mixing in a mixer for 3 hours at 120° C.

The electrical properties and water resistance of the silicone rubber composition were measured as in Example 1, and the obtained results are reported in Table 2.

Comparative Example 2

The following were mixed to homogeneity in a kneader mixer into 100 parts vinyldimethylsiloxy-endblocked dimethylsiloxanevinylmethylsiloxane copolymer gum containing 99.87 mole % dimethylsiloxy units and 0.13 mole % vinylmethylsiloxy units: 30 weight parts fumed silica with a specific surface area of 200 m²/g and 12 parts silanol-endblocked polydimethylsiloxane with a viscosity of 30 mPa.s as surface-treatment agent. Heating at 175° C. for 30 minutes then gave a silicone rubber base. 160 Parts untreated aluminum hydroxide powder (brand name: Higilite H42M from Showa Denko Kabushiki Kaisha, average particle size=1 μm) were then mixed to homogeneity at room temperature into the above-described silicone rubber base. The addition to 100 parts of this silicone rubber base of curing agent as described in Example 1 then afforded a curable EI silicone rubber composition. The electrical properties and water resistance of this silicone rubber composition were measured as in Example 1 and the obtained results are reported in Table 2.

EXAMPLE 4

The following were mixed to homogeneity into 100 parts vinyldimethylsiloxy-endblocked polydimethylsiloxane with a viscosity of 10,000 mPa.s (silicon-bonded vinyl content= 0.14 weight %): 30 parts fumed silica with a specific surface area of 200 m²/g, 150 parts untreated aluminum hydroxide powder (Higilite H42M, from Showa Denko Kabushiki Kaisha), and, as surface-treatment agent, 10 parts hexamethyldisilazane and 3 parts water. This was followed by mixing for an additional 2 hours at 170° C. in a vacuum to give a silicone rubber base compound. A curable EI silicone rubber composition was then prepared by mixing this base compound to homogeneity with 1.4 parts trimethylsiloxy-endblocked dimethylsiloxane-methylhydrogensiloxane copolymer with a silicon-bonded hydrogen content of 0.7 weight % and, as hydrosilylation reaction catalyst, sufficient 3 weight % isopropanolic chloroplatinic acid solution to provide 10 ppm platinum metal. The electrical properties and water resistance of the cured EI silicone rubber composition were measured as in Example 1, and these results are reported in Table 3.

TABLE 1

|  | Example 1 | Example 2 | Comparative Example 1 |
|---|---|---|---|
| initial |  |  |  |
| volume resistivity (Ω-cm) | $1.2 \times 10^{14}$ | $1.5 \times 10^{14}$ | $1.9 \times 10^{14}$ |
| dielectric constant | 4.4 | 4.0 | 4.0 |
| dissipation factor | $1.4 \times 10^{-2}$ | $9.0 \times 10^{-3}$ | $1.2 \times 10^{-2}$ |
| tracking resistance |  |  |  |
| evaluation A (min) | ≧360 | ≧360 | ≧360 |
| evaluation B (min) after dipping in water for 100 hours | ≧360 | ≧360 | ≧360 |
| volume resistivity (Ω-cm) | $1.1 \times 10^{14}$ | $9.5 \times 10^{13}$ | $2.4 \times 10^{10}$ |
| dielectric constant | 4.8 | 4.5 | 7.8 |
| dissipation factor | $2.2 \times 10^{-2}$ | $1.5 \times 10^{-2}$ | $2.5 \times 10^{-1}$ |
| water absorption (%) | 0.2 | 0.25 | 1.9 |

TABLE 2

|  | Example 3 | Comparative Example 2 |
|---|---|---|
| initial |  |  |
| volume resistivity (Ω-cm) | $1.9 \times 10^{14}$ | $2.0 \times 10^{14}$ |
| dielectric constant | 4.4 | 4.2 |
| dissipation factor | $1.1 \times 10^{-2}$ | $2.0 \times 10^{-2}$ |
| tracking resistance |  |  |
| evaluation A (min) | ≧360 | ≧360 |
| evaluation B (min) after dipping in water for 100 hours | ≧360 | ≧360 |
| volume resistivity (Ω-cm) | $7.0 \times 10^{13}$ | $2.1 \times 10^{10}$ |
| dielectric constant | 4.7 | 7.4 |
| dissipation factor | $3.3 \times 10^{-2}$ | $2.08 \times 10^{-1}$ |
| water absorption (%) | 0.28 | 1.5 |

TABLE 3

|  | Example 4 |
|---|---|
| initial |  |
| volume resistivity (Ω-cm) | $7.5 \times 10^{14}$ |
| dielectric constant | 3.5 |
| dissipation factor | $9.3 \times 10^{-3}$ |
| tracking resistance |  |
| evaluation A (min) | ≧360 |
| evaluation B (min) after dipping in water for 100 hours | ≧360 |
| volume resistivity (Ω-cm) | $2.2 \times 10^{14}$ |
| dielectric constant | 3.8 |
| dissipation factor | $1.2 \times 10^{-2}$ |
| water absorption (%) | 0.15 |

We claim:

1. An electrical insulating silicone rubber composition comprising
   (A) 100 weight parts polyorganosiloxane comprising at least 2 silicon bonded alkenyl groups in each molecule and having average compositional formula $R_a SiO_{(4-a)/2}$, where R is selected from the group consisting of substituted monovalent hydrocarbon groups and unsubstituted monovalent hydrocarbon groups and a has a value of from 1.95 to 2.05,
   (B) 1 to 300 with parts surface-treated aluminum hydroxide powder surface treated with a treating agent selected from the group consisting of organomethoxysilanes, organoethoxysilanes, and organosilazanes, and
   (C) an organoperoxide curing agent in a quantity sufficient to cure the composition.

2. A composition according to claim 1, where the polyorganosiloxane has a viscosity at 25° C. of from 100 mpa.s to 20,000,000 mPa.s.

3. A composition according to claim 2, where the polyorganosiloxane is selected from a group consisting of vinyldimethylsiloxy-endblocked polydimethylsiloxanes and vinyldimethylsiloxy-endblocked dimethylsiloxane-vinylmethylsiloxane copolymer.

4. A composition according to claim 1, where the surface treated aluminum hydroxide powder has a particle size of from 0.1 μm to 50 μm.

5. A composition according to claim 1, where the surface treated aluminum hydroxide powder is surface treated with an organomethoxysilane or an organoethoxysilane.

6. A composition according to claim 5 where the surface treated aluminum hydroxide powder is surface treated with vinyltrimethoxyilane.

7. A composition according to claim 5, where the surface treated aluminum hydroxide powder is surface treated with methyltrimethoxysilane.

8. A composition according to claim 1, where the surface treated aluminum hydroxide powder is surface treated with an organosilazane.

9. A composition according to claim 8, where the organosilazane is selected from the group consisting of hexamethyldisilazane and divinyltetramethyldisilazane.

10. A composition according to claim 1, where the surface treated aluminum hydroxide powder is surface treated with from 0.1 to 30 weight percent of the treating agent.

11. A composition according to claim 1 further comprising (D) 1 to 200 weight parts microparticulate silica.

12. A composition according to claim 11 where the microparticulate silica is a fumed silica having a specific surface area greater than or equal to 50 $m^2/g$.

13. A composition according to claim 11, where surface treated aluminum hydroxide powder is surface treated with vinyltrimethoxysilane.

14. A composition according to claim 11, where the surface treated aluminum hydroxide powder is surface treated with methyltrimethoxysilane.

15. A composition according to claim 5 where the treating agent is selected from the group consisting of methyltrimethoxysilane, methyltriethoxysilane, phenyltrimethoxysilane, ethyltrimethoxysilane, n-propyltrimethoxysilane, vinyltrimethoxysilane, allyltrimethoxysilane, butenyltrimethoxysilane, hexenyltrimethoxysilane, γ-methacryoxypropyltrimethoxysilane, dimethyldimethoxysilane, dimethyldiethoxysilane, diphenyldimethoxysilane, and tetraethoxysilane.

* * * * *

(12) EX PARTE REEXAMINATION CERTIFICATE (9684th)
United States Patent
Takuman et al.

(10) Number: US 6,090,879 C1
(45) Certificate Issued: May 31, 2013

(54) SILICONE RUBBER COMPOSITION FOR APPLICATION AS ELECTRICAL INSULATION

(75) Inventors: Osamu Takuman, Chiba Prefecture (JP); Takao Matsushita, Chiba Prefecture (JP)

(73) Assignee: Dow Corning Toray Silicone Company, Ltd., Chiyoda-Ku, Tokyo (JP)

Reexamination Request:
No. 90/012,258, Apr. 20, 2012

Reexamination Certificate for:
Patent No.: 6,090,879
Issued: Jul. 18, 2000
Appl. No.: 08/862,045
Filed: May 22, 1997

(30) Foreign Application Priority Data

May 24, 1996 (JP) ........................................ 8-152978

(51) Int. Cl.
*C08K 9/06* (2006.01)
*C08L 83/04* (2006.01)

(52) U.S. Cl.
USPC ........... 524/437; 523/203; 523/209; 523/212; 524/588

(58) Field of Classification Search
None
See application file for complete search history.

(56) References Cited

To view the complete listing of prior art documents cited during the proceeding for Reexamination Control Number 90/012,258, please refer to the USPTO's public Patent Application Information Retrieval (PAIR) system under the Display References tab.

*Primary Examiner* — Timothy J Kugel

(57) ABSTRACT

A silicone rubber composition for application as electrical insulation that cures into a highly water-resistant silicone rubber that has excellent electrical properties and in particular has excellent high-voltage electrical insulation properties. The silicone rubber composition comprises
(A) polyorganosiloxane,
(B) surface-treated aluminum hydroxide powder surface treated with an organosilane or organosilazane, and
(C) curing agent.
Also, the composition afforded by the addition of 1 to 200 weight parts (D) microparticulate silica to components (A) to (C).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8, 10 and 12-15 are determined to be patentable as amended.

Claims 9 and 11, dependent on an amended claim, are determined to be patentable.

New claims 16-20 are added and determined to be patentable.

1. An electrical insulating silicone rubber composition comprising
(A) 100 weight parts polyorganosiloxane comprising at least 2 silicon bonded alkenyl groups in each molecule and having average compositional formula $$R_aSiO_{(4-a)/2},$$

where R is selected from the group consisting of substituted monovalent hydrocarbon groups and unsubstituted monovalent hydrocarbon groups and a has a value of from 1.95 to 2.05,
(B) 1 to 300 [with] *weight* parts surface-treated aluminum hydroxide powder surface treated with a treating agent selected from the group consisting of organomethoxysilanes, organoethoxysilanes, and organosilazanes, and
(C) an organoperoxide curing agent in a quantity sufficient to cure the composition, *wherein at least 2 silicon bonded alkenyl groups of the polyorganosiloxane are bonded in terminal positions, or in a terminal position and a non-terminal position.*

2. A composition according to claim 1, where the polyorganosiloxane has a viscosity at 25° C. of from 100 [mpa.s] *mPa.s* to 20,000,000 mPa.s.

3. A composition according to claim [2] *1*, where the polyorganosiloxane is selected from a group consisting of vinyldimethylsiloxy-endblocked polydimethylsiloxanes and vinyldimethylsiloxy-endblocked dimethylsiloxane-vinylmethylsiloxane copolymer.

4. A composition according to claim 1, where the [surface-treated] *surface-treated* aluminum hydroxide powder has a particle size of from 0.1 μm to 50 μm.

5. A composition according to claim 1, where the [surface-treated] *surface-treated* aluminum hydroxide powder is surface treated with an organomethoxysilane or an organoethoxysilane.

6. A composition according to claim 5, where the [surface-treated] *surface-treated* aluminum hydroxide powder is surface treated with [vinyltrimethoxyilane] *vinyltrimethoxysilane*.

7. A composition according to claim 5, where the [surface-treated] *surface-treated* aluminum hydroxide powder is surface treated with methyltrimethoxysilane.

8. A composition according to claim 1, where the [surface-treated] *surface-treated* aluminum hydroxide powder is surface treated with an organosilazane.

10. A composition according to claim 1, where the [surface-treated] *surface-treated* aluminum hydroxide powder is surface treated with from 0.1 to 30 weight percent of the treating agent.

12. A composition according to claim 11, where the microparticulate silica is a fumed silica having a specific surface area greater than or equal to 50 m²/g.

13. A composition according to claim 11, where *the* [surface treated] *surface-treated* aluminum hydroxide powder is surface treated with vinyltrimethoxysilane.

14. A composition according to claim 11, where the [surface treated] *surface-treated* aluminum hydroxide powder is surface treated with methyltrimethoxysilane.

15. A composition according to claim 5, where the treating agent is selected from the group consisting of methyltrimethoxysilane, methyltriethoxysilane, phenyltrimethoxysilane, ethyltrimethoxysilane, n-propyltrimethoxysilane, vinyltrimethoxysilane, allyltrimethoxysilane, butenyltrimethoxysilane, hexenyltrimethoxysilane, gamma[.]-methacryoxypropyltrimethoxysilane, dimethyldimethoxysilane, dimethyldiethoxysilane, diphenyldimethoxysilane, and tetraethoxysilane.

*16. A composition according to claim 1, where the surface-treated aluminum hydroxide powder is surface treated with gamma-methacryloxypropyltrimethoxysilane.*

*17. A composition according to claim 1, where the surface-treated aluminum hydroxide powder is surface treated with an organomethoxysilane.*

*18. A composition according to claim 1, where the surface-treated aluminum hydroxide powder is surface treated with an alkenylalkoxysilane.*

*19. A composition according to claim 3, where the surface-treated aluminum hydroxide powder is surface treated with an alkenylalkoxysilane.*

*20. A composition according to claim 1, wherein the polyorganosiloxane is endblocked with vinyldimethylsiloxy units.*

* * * * *